US008853136B2

(12) United States Patent
Bittner et al.

(10) Patent No.: US 8,853,136 B2
(45) Date of Patent: Oct. 7, 2014

(54) PROCESS FOR TERTIARY MINERAL OIL PRODUCTION USING SURFACTANT MIXTURES

(75) Inventors: Christian Bittner, Bensheim (DE); Günter Oetter, Frankenthal (DE); Jack Tinsley, Mannheim (DE); Christian Spindler, Ludwigshafen (DE); Gabriela Alvarez Jürgenson, Mannheim (DE); Sophie Vogel, Mannheim (DE)

(73) Assignee: BASF SE, Ludwigshafen (DE)

( * ) Notice: Subject to any disclaimer, the term of this patent is extended or adjusted under 35 U.S.C. 154(b) by 828 days.

(21) Appl. No.: 12/903,654

(22) Filed: Oct. 13, 2010

(65) Prior Publication Data

US 2011/0083847 A1 Apr. 14, 2011

Related U.S. Application Data

(60) Provisional application No. 61/251,315, filed on Oct. 14, 2009.

(51) Int. Cl.
*C09K 8/584* (2006.01)

(52) U.S. Cl.
CPC .................................. *C09K 8/584* (2013.01)
USPC ........... 507/255; 507/259; 507/260; 507/261; 507/266; 507/267; 166/270.1

(58) Field of Classification Search
None
See application file for complete search history.

(56) References Cited

U.S. PATENT DOCUMENTS

| 3,811,504 A | 5/1974 | Flournoy et al. |
| 3,811,505 A | 5/1974 | Flournoy et al. |
| 4,077,471 A | 3/1978 | Shupe et al. |
| 5,741,947 A | 4/1998 | Wolf et al. |
| 7,279,447 B2 * | 10/2007 | Lal et al. ........................ 507/139 |
| 7,335,235 B2 | 2/2008 | Ruland et al. |
| 7,435,706 B2 * | 10/2008 | Mueller et al. ............... 507/136 |
| 2004/0121916 A1 * | 6/2004 | Kono et al. .................... 507/100 |
| 2004/0147404 A1 * | 7/2004 | Thaemlitz et al. ............. 507/100 |
| 2006/0185845 A1 | 8/2006 | Shpakoff et al. |
| 2006/0189486 A1 | 8/2006 | Shpakoff et al. |

FOREIGN PATENT DOCUMENTS

| DE | 4325237 A1 | 2/1995 |
| DE | 10243361 A1 | 4/2004 |
| GB | 2168095 | 6/1986 |
| WO | WO-99/16775 | 4/1999 |
| WO | WO-00/74845 | 12/2000 |
| WO | WO-2006/131541 | 12/2006 |
| WO | WO-2009/124922 | 10/2009 |
| WO | WO-2009/130141 | 10/2009 |

OTHER PUBLICATIONS

Search Report mailed in related International Application No. PCT/EP2010/065154 on Dec. 17, 2010 (non-English).

* cited by examiner

*Primary Examiner* — John J Figueroa
(74) *Attorney, Agent, or Firm* — Drinker Biddle & Reath LLP

(57) ABSTRACT

A process for mineral oil production, especially Winsor type III microemulsion flooding, in which an aqueous surfactant formulation which comprises at least one alkylpolyalkoxysulfate comprising propoxy groups, and at least one further surfactant differing therefrom is used, is forced through injection wells into a mineral oil deposit and crude oil is removed from the deposit through production wells. The alkylpolyalkoxysulfate comprising propoxy groups is prepared in this case by sulfating an alkoxylated alcohol, the alkoxylated alcohol being prepared by alkoxylating an alcohol using double metal cyanide catalysts or double hydroxide clays.

18 Claims, No Drawings

PROCESS FOR TERTIARY MINERAL OIL PRODUCTION USING SURFACTANT MIXTURES

CROSS REFERENCE TO RELATED APPLICATIONS

This application is a non-provisional of U.S. Provisional Application No. 61/251,315, filed Oct. 14, 2009, the entire disclosure of which is hereby incorporated by reference.

The invention relates to a process for mineral oil production in which an aqueous surfactant formulation which comprises at least one alkylpolyalkoxysulfate comprising propoxy groups, and at least one further surfactant is forced through injection wells into a mineral oil deposit and crude oil is removed from the deposit through production wells. The process may in particular constitute Winsor type III microemulsion flooding.

In natural mineral oil deposits, mineral oil is present in the cavities of porous reservoir rocks which are closed off from the earth's surface by impervious covering strata. The cavities may be very fine cavities, capillaries, pores or the like. Fine pore necks may have, for example, a diameter of only about 1 µm. In addition to mineral oil, including proportions of natural gas, a deposit contains water having a higher or lower salt content.

In mineral oil production, a distinction is made between primary, secondary and tertiary production.

In primary production, after drilling into the deposit, the mineral oil flows by itself under the autogenous pressure of the deposit through the well to the surface.

After primary production, the secondary production is therefore used. In secondary production, in addition to the wells which serve the production of the mineral oil, the so-called production wells, further wells are drilled into the mineral oil-carrying formation. Water is forced through these so-called injection wells into the deposit in order to maintain the pressure or to increase it again. By forcing in water, the mineral oil is slowly forced through the cavities in the formation, starting from the injection well, in the direction of the production well. However, this functions only as long as the cavities are completely filled with oil and the more viscous oil is pushed ahead by the water. As soon as the low-viscosity water breaks through cavities, it flows from this time onward along the path of least resistance, i.e. through the resulting channel, and no longer pushes the oil in front of it.

As a rule, only about 30 to 35% of the amount of mineral oil present in the deposit can be extracted by means of primary and secondary production.

It is known that the mineral oil yield can be further increased by tertiary oil production measures. An overview of tertiary oil production is to be found, for example, in Journal of Petroleum Science and Engineering 19 (1998) 265-280. Tertiary oil production includes thermal processes in which hot water or superheated steam is forced into the deposit. As a result of this, the viscosity of the oil is reduced. Gases, such as $CO_2$ and nitrogen, can also be used as a flooding medium.

Tertiary oil production furthermore includes processes in which suitable chemicals are used as assistants for oil production. The situation toward the end of the water flood can be influenced by these and mineral oil held in the rock formation up to that time can also be extracted thereby.

For example, the interfacial tension a between the mineral oil and the aqueous phase can be reduced by the addition of suitable surfactants. This technique is also known as "surfactant flooding". In particular, surfactants which can reduce σ to values of $<10^{-2}$ mN/m (ultralow interfacial tension) are suitable for this purpose. In this way, the oil droplets are able to change their shape and can be forced through the capillary openings by the flood water.

The oil droplets can then combine to form a continuous oil layer. This has advantages in two respects: firstly, when the continuous oil layer advances through new porous rock, the oil droplets present there can coalesce with the layer. Furthermore, the oil-water interface is substantially reduced by the combination of the oil droplets to form an oil layer, and surfactant no longer required is therefore released. The surfactant released can then mobilize oil droplets remaining in the formation.

The requirements regarding surfactants for tertiary mineral oil productions differ substantially from requirements regarding surfactants for other applications: suitable surfactants for tertiary mineral oil production should reduce the interfacial tension between water and oil (usually about 20 mN/m) to particularly low values of less than $10^{-2}$ mN/m in order to permit sufficient mobilization of the mineral oil. This must take place at the usual deposit temperatures of about 15° C. to about 130° C. and in the presence of water having a high salt content, in particular also in the presence of high proportions of calcium and/or magnesium ions; the surfactants must therefore also be soluble in reservoir water having a high salt content.

Mixtures of surfactants, in particular mixtures of anionic and nonionic surfactants, have already frequently been proposed for meeting these requirements.

U.S. Pat. No. 3,811,505 discloses a mixture of an anionic and a nonionic surfactant for use in deposits whose reservoir water comprises from 0.5 to 0.9% by weight of polyvalent ions. The anionic surfactants are alkanesulfonates or alkylphosphates having in each case from 5 to 25 carbon atoms or alkylarylsulfonates or alkylarylphosphates whose alkyl radical has in each case 5 to 25 carbon atoms. The nonionic surfactants are polyethoxylated alkylphenols which have from 6 to 20 ethoxy groups and whose alkyl radical has 5 to 20 carbon atoms or polyethoxylated aliphatic alcohols having 6 to 20 carbon atoms and from 6 to 20 ethoxy groups.

U.S. Pat. No. 3,811,504 discloses a mixture of 2 different anionic surfactants and a nonionic surfactant for use in deposits whose reservoir water comprises from 0.15 to 1.2% of calcium and magnesium ions. The first anionic surfactant comprises alkanesulfonates or alkylarylsulfonates, and the second comprises alkylpolyethoxysulfates. The nonionic surfactants may be polyethoxylated alkylphenols which have from 6 to 20 ethoxy groups and whose alkyl radical has 5 to 20 carbon atoms, or polyethoxylated aliphatic alcohols having 6 to 20 carbon atoms and from 6 to 20 ethoxy groups.

U.S. Pat. No. 4,077,471 discloses a surfactant mixture for use in a formation whose reservoir water has a salt content of from 7 to 22%. The mixture comprises a water-soluble alkylpolyalkoxyalkanesulfonate or alkylarylpolyalkoxyalkanesulfonate and a water-insoluble nonionic surfactant obtained from an ethoxylated aliphatic alcohol or an ethoxylated, alkyl-substituted aromatic alcohol, the hydrocarbon groups having in each case 8 to 24 carbon atoms and the number of ethoxy groups being from 1 to 20.

US 2006/0185845 A1 discloses the use of a mixture of at least one aliphatic anionic surfactant and a branched aliphatic nonionic surfactant for mineral oil production. The branched aliphatic radical preferably has 10 to 24 carbon atoms and the degree of branching is from 0.7 to 2.5.

US 2006/018486 2006/0189486 discloses the use of a mixture of at least one branched aliphatic anionic surfactant and an aliphatic nonionic surfactant for mineral oil production.

The branched aliphatic radical preferably has from 10 to 24 carbon atoms and the degree of branching is from 0.7 to 2.5.

Our prior application WO 2009/124922 discloses surfactants of the general formula iso-$C_{17}H_{35}$—X, in which X is a polar group and iso-$C_{17}H_{35}$ is an alkyl radical having a degree of branching of from 2.8 to 3.7. The document discloses nonionic surfactants of the general formula iso-$C_{17}H_{35}$—O—$(CH_2CH(CH_3)O)_n(CH_2CH_2O)_m$—H, n being from 0 to 15, m being from 1 to 20, preferably from 5 to 14, and the sum n+m being from 1 to 35, preferably from 2 to 20. The alkoxylation of the surfactants can be carried out by means of acidic catalysis, KOH catalysis or catalysis by means of DMC catalysts. The alkoxylates can be converted to the corresponding sulfates by sulfation.

In a preferred embodiment of the surfactant flooding, the surfactants should form a microemulsion of Winsor type III with the water phase and the oil phase. The microemulsion (Winsor type III) is not an emulsion comprising particularly small droplets but a thermodynamically stable, liquid mixture of water, oil and surfactants which has a very low interfacial tension and as a rule a very low viscosity. Its three advantages are that it achieves a very low interfacial tension a between mineral oil and aqueous phase, it generally has a very low viscosity and so does not become trapped in a porous matrix, it is produced even with very small energy inputs and is able to remain stable for an infinitely long time (whereas conventional emulsions require relatively high shearing forces, which predominantly do not arise in the reservoir, and are stabilized only kinetically).

The Winsor III microemulsion is in equilibrium with excess water and excess oil. Under these conditions of microemulsion formation, the surfactants coat the oil/water interface and lower the interfacial tension σ.

Since Winsor III microemulsions are particularly low in viscosity as compared with other types of emulsion, they are able in the flooding operation to go through the porous reservoir rock. Conventional emulsions, in contrast, may remain stuck in the porous matrix, blocking it. The Winsor type III microemulsion flooding, consequently, is an extremely efficient process, and, unlike an emulsion flooding process, requires significantly less surfactant. With microemulsion flooding, the surfactants are typically injected alternatively together with cosolvents and/or with basic salts (optionally in the presence of chelating agents). Subsequently, a solution of thickening polymer is injected for mobility control. A further variant is the injection of a mixture of thickening polymer and also surfactants, cosolvents and/or basic salts (optionally with chelating agent) and, subsequently, a solution of thickening polymer for mobility control. These solutions ought generally to be clear, in order to avoid blockages of the reservoir.

The requirements imposed on surfactants for tertiary mineral oil production differ markedly from requirements imposed on surfactants for other applications: Suitable surfactants for tertiary oil production are intended to reduce the interfacial tension between water and oil (usually about 20 mN/m) to particularly low values of less than $10^{-2}$ mN/m, in order to allow sufficient mobilization of the mineral oil. This reduction must be accomplished at the usual reservoir temperatures of around 15° C. to 130° C. and in the presence of water with a high salt content, not least in the presence of high proportions of calcium ions and/or magnesium ions; the surfactants, therefore, must be soluble even in reservoir water with a high salt content.

In order to obtain an optimum result, the proportion of the microemulsion in the water-microemulsion-oil system at a defined amount of surfactant should of course be as great as possible. The parameters used, such as, for example, type, concentration and the mixing ratio of the surfactants used relative to one another, are therefore adapted by a person skilled in the art to the conditions (temperature, salt content) prevailing in a given mineral oil formation.

The interfacial tension should be as low as possible and the separation into the phases of the microemulsion should take place as quickly as possible.

It was an object of the invention to provide surfactant mixtures which fulfill these requirements.

Accordingly, a process for mineral oil production is found in which an aqueous surfactant formulation comprising at least one anionic surfactant and at least one further surfactant is forced through at least one injection well into a mineral oil deposit and crude oil is removed from the deposit through at least one production well, the surfactant mixture at least comprising (A) at least one surfactant (A) of the general formula $R^1$—O—$(CH_2$—CH—$(CH_3)O)_x$—$(CH_2$—$CH_2O)_y$—$SO_3M$, in which $R^1$ is a straight-chain or branched aliphatic and/or aromatic hydrocarbon radical having 8 to 32 carbon atoms, M is $H^+$ and/or a k-valent counterion $1/k\, Y^{k+}$, x is a number from 4 to 30, and y is a number from 0 to 30, and the sum is x+y≤50, the surfactant (A) being prepared by sulfation of the alkoxylated alcohol $R^1$—O—$(CH_2$—CH—$(CH_3)O)_x$—$(CH_2$—$CH_2O)_y$—H, with the proviso that the alkoxylated alcohol is prepared by alkoxylation of an alcohol $R_1$—OH using double metal cyanide catalysts, and (B) at least one surfactant (B) differing therefrom and of the general formula $R^2$—Y, in which $R^2$ is a straight-chain or branched aliphatic and/or aromatic hydrocarbon radical having 8 to 32 carbon atoms and Y is a hydrophilic group, the weight ratio (A)/(B) being from 10:1 to 1:20, and the proportion of the surfactants (A) and (B) together being at least 50% by weight, based on the amount of all surfactants in the surfactant mixture used.

Furthermore, a surfactant mixture for mineral oil production which comprises the two surfactants (A) and (B) was found.

The following may be stated specifically regarding the invention:

In the process according to the invention for mineral oil production, an aqueous formulation which comprises at least one surfactant (A) and at least one surfactant (B) differing therefrom is used. It may moreover comprise further surfactants and/or other components.

Surfactants (A)

The surfactants (A) have the general formula $R^1$—O—$(CH_2$—CH—$(CH_3)O)_n$—$(CH_2$—$CH_2O)_y$—$SO_3M$ (I). One or more different surfactants (A) of the formula (I) can be used.

The radical $R^1$ is a straight-chain or branched, aliphatic and/or aromatic hydrocarbon radical having 8 to 32 carbon atoms, preferably 9 to 22, particularly preferably 9 to 18 and very particularly preferably 10 to 17 carbon atoms.

It is preferably a straight-chain or branched aliphatic hydrocarbon radical, in particular a straight-chain or branched aliphatic hydrocarbon radical having 9 to 18 carbon atoms.

A branched aliphatic hydrocarbon radical has as a rule a degree of branching of from 0.1 to 4.5, preferably from 1 to 3.5. The term "degree of branching" is defined here in a manner known in principle as the number of methyl groups in a molecule of the alcohol minus 1. The average degree of branching is the statistical mean value of the degrees of branching of all molecules of a sample.

In the above formula (I), x is a number from 4 to 30, preferably from 6 to 18 and very particularly preferably from 7 to 14 and y is a number from 0 to 30, preferably from 0 to 20 and particularly preferably from 0 to 10.

In this case, the sum x+y is ≤50, preferably ≤40, particularly preferably ≤30 and, for example, ≤25. Preference is furthermore given to x>y.

For the person skilled in the art in the area of polyalkoxylates, it is clear that the numbers x are mean values of all molecules of a sample because, in the alkoxylation of alcohols with alkylene oxides, a certain distribution of chain lengths is obtained.

If y is >0, these are surfactants having a block structure, the blocks being arranged in the sequence shown in formula (I). If y=0, the surfactant has only one polypropylene oxide block.

In formula (I), M is $H^+$ or a k-valent counterion $1/k\, Y^{k+}$. Here, k is the charge of the counterion. It is preferably a monovalent counterion, such as $NH_4^+$-, ammonium ions having organic radicals or alkali metal ions. Preferably, Y is $Li^+$, $Na^+$ and $K^+$ and particularly preferably $Na^+$. The surfactant (A) may therefore be present as free acid or as a salt thereof.

In a preferred embodiment of the invention, $R^1$ is a linear, aliphatic hydrocarbon radical, in particular a linear, aliphatic hydrocarbon radical having 9 to 18 carbon atoms, x being a number from 4 to 30, preferably from 6 to 18.

In a further preferred embodiment of the invention, $R^1$ is a branched, aliphatic hydrocarbon radical, x being a number from 4 to 30, preferably from 6 to 18.

The surfactants (A) are prepared by means of an at least two-stage process in which, in a first process step (1), an alcohol $R^1$—OH is alkoxylated with propylene oxide and optionally ethylene oxide to give an alkoxylated alcohol of the general formula. $R^1$—O—$(CH_2$—CH—$(CH_3)O)_x$—$(CH_2$—$CH_2O)_y$—H (II), $R^1$, x and y having the above meaning. In a second step, the alkoxylated alcohols (II) are sulfated by processes known in principle to the person skilled in the art.

According to the invention, the alkoxylation can be carried out using double metal cyanide catalysts (DMC catalyst). This gives alkoxylated alcohols which have a narrower molecular weight distribution than alkoxylated alcohols which are obtained by means of a customary base-catalyzed alkoxylation, for example a customary alkoxylation with KOH.

The molecular weight distribution of the alcohols obtained can be described in a manner known in principle by the so-called polydispersity D. $D=M_w/M_n$ is the quotient of the weight average molar mass and the number average molar mass. By means of DMC catalysis, it is possible to achieve alkoxylated alcohols having polydispersities of less than 1.05.

Double metal cyanide (DMC) catalysts for carrying out alkoxylations are in principle known to the person skilled in the art. Suitable DMC catalysts are disclosed, for example, in DE 102 43 361 A1, in particular paragraphs [0029] to [0041] and the literature cited therein, such as, for example, WO 00/74845 or WO 99/16775. For example, Zn—Co type catalysts can be used.

For carrying out the reaction, the catalyst can be added to the alcohol $R^1$—OH. By means of reduced pressure (for example <100 mbar) and/or by increasing the temperature (30 to 150° C.), water still present in the mixture can be removed. Thereafter, inert conditions are established with inert gas (e.g. nitrogen) and the ethylene oxide is added stepwise at temperatures of from 60 to 180° C. up to a pressure of not more than 10 bar. Usually, not more than 1000 ppm of catalyst, based on the mixture, are used and, owing to this small amount, the catalyst can remain in the product. The amount of catalyst may as a rule be less than 1000 ppm, for example 250 ppm or less.

However, the invention is not limited to the use of double metal cyanide catalysts for carrying out the alkoxylation. In principle, all processes which lead to alkoxylated alcohols which have a narrower molecular weight distribution—in comparison with base catalysis with KOH—can be used for the alkoxylation of the alcohol $R^1$—OH. In other words, all methods in which the ratio $D_v/D_{KOH}$ is <1 are suitable, $D_v$ being the polydispersity of a product obtained by means of the process used and $D_{KOH}$ being the polydispersity of a product obtained by means of KOH catalysis. For the synthesis of the surfactants (A), for example, it is also possible to use, as the catalyst, for example double hydroxide clays as described in DE 43 25 237 A1 or catalysts selected from the group consisting of hydrophobized hydrotalcites, modified oxides or hydroxides of calcium, strontium or barium or phosphates of lanthanum or lanthanides.

The sulfation of the alkoxylated alcohols (II) presents no difficulties at all and can be carried out by methods known in principle by the person skilled in the art. For example, the alkoxylated alcohol (II) can be reacted with sulfur trioxide or chlorosulfonic acid. The sulfation with sulfur trioxide can be carried out, for example, in a falling-film reactor. The reaction product can then be neutralized, for example with sodium hydroxide solution.

Surfactants (B)

In addition to the at least one surfactant (A), the formulation used comprises at least one surfactant (B) differing therefrom and of the general formula $R^2$—Y (II). Of course, a mixture of a plurality of different surfactants (B) can also be used.

$R^2$ is a straight-chain or branched, aliphatic and/or aromatic hydrocarbon radical having 8 to 32 carbon atoms, preferably 9 to 28 and particularly preferably from 10 to 24 carbon atoms.

In the formula (II), Y is a hydrophilic group. The said group may in principle be any hydrophilic groups, provided the group is sufficiently polar in order to impart amphiphilic properties, i.e. surfactant properties, to the compound. Said surfactants may be nonionic surfactants or anionic, cationic or betaine surfactants.

Preferably, the group Y is a group selected from the group consisting of sulfate groups, sulfonate groups, polyoxyalkylene groups, anionically modified polyoxyalkylene groups, glucoside groups, betaine groups or amine oxide groups.

In an embodiment of the invention, the surfactant (B) is an anionic surfactant, in particular an anionic surfactant having sulfo groups without additional alkoxy groups. Examples of such surfactants comprise alkylbenzenesulfonates, olefinsulfonates, paraffinsulfonates, alkylcarboxylates, alkylsulfates and/or alkylphosphates.

In a further embodiment of the invention, the surfactant (B) is a surfactant selected from the group consisting of alkyl ethoxylates, the polyether group of the surfactant comprising in each case from 2 to 40 ether units.

In a further embodiment of the invention, the surfactant (B) is a surfactant selected from the group consisting of alkylbenzenesulfonates, olefinsulfonates or paraffinsulfonates.

Further Surfactants

In addition to the surfactants (A) and (B), the formulation can moreover optionally also comprise surfactants (C) differing from (A) and (B).

Surfactants (C) may be in particular oligomeric or polymeric surfactants. With such polymeric cosurfactants, the amount of surfactant which is required for the formation of a microemulsion can advantageously be reduced. Such polymeric cosurfactants are therefore also referred to as "microemulsion boosters". Examples of such polymeric surfactants (C) comprise amphiphilic block copolymers which Comprise at least one hydrophilic and at least one hydrophobic block. Examples comprise polypropylene oxide-polyethylene oxide block copolymers, polyisobutene-polyethylene oxide block copolymers and comb polymers having polyethylene oxide side chains and a hydrophobic main chain, the main chain preferably comprising substantially olefins or (meth)acrylates as structural units. The term "polyethylene oxide" is intended here in each case to include polyethylene oxide blocks according to the above definition which comprise propylene oxide units. Further details of such surfactants are disclosed in WO 2006/131541.

Process for Mineral Oil Production

In the process according to the invention for mineral oil production, a suitable aqueous formulation of the surfactants (A) and (B) and optionally (C) is forced through at least one injection well into the mineral oil deposit and crude oil is removed from the deposit through at least one production well. A technique of this kind is also known as "surfactant flooding". In this context, the term "crude oil" does not of course mean single-phase oil but means the customary crude oil-water emulsions. As a rule, a deposit is provided with a plurality of injection wells and with a plurality of production wells. The principal action of the surfactants here lies in reducing the interfacial tension between water and oil. This raises the mobility of the mineral oil in the reservoir, and allows the production of mineral oil which, without the application of surfactants, would remain in the reservoir. In this context, the interfacial tension between water and oil ought to be lowered to levels of less than 0.1 mN/m, preferably less than 0.01 mN/m.

After the forcing in of the surfactant formulation, water ("water flooding") or preferably a more highly viscous, aqueous solution of a polymer having a pronounced thickening effect ("polymer flooding") can be injected into the formation for maintaining the pressure. Further known techniques are the injection of an aqueous solution which comprises surfactant and thickening polymer. Optionally, said solution may also comprise alkali metal or sodium carbonate. Subsequently, an aqueous solution which only comprises thickening polymer is injected. However, other known techniques are those in which the surfactants are first allowed to act on the formation. Details of the technical procedure of "surfactant flooding", "water flooding" and "polymer flooding" are known to a person skilled in the art and he uses a corresponding technique according to the type of deposit.

In one preferred embodiment of the invention, the process of the invention for mineral oil production constitutes "Winsor type III microemulsion flooding", i.e., the injected surfactant mixture in the reservoir, together with the water phase and the oil phase present in the reservoir, forms a Winsor type III microemulsion. Details of Winsor III microemulsions and their advantages have already been outlined at the beginning. For Winsor type III microemulsion flooding, the interfacial tension between water and oil ought to be lowered to levels of less than 0.1 mN/m, preferably less than 0.015 mN/m, and with particular preference less than 0.01 mN/m.

For the process according to the invention, an aqueous formulation of the surfactants (A), (B) and optionally (C) is used. The formulations described below are particularly suitable for Winsor III microemulsion flooding, but can also be used for other surfactant flooding techniques.

In addition to water, the formulations can optionally also comprise organic solvents miscible with water or at least dispersible in water. Such additions serve in particular for stabilizing the surfactant solution during the storage or the transport to the oil field. However, the amount of such additional solvents should as a rule not exceed 50% by weight, preferably 20% by weight and particularly preferably 10% by weight. In a particularly advantageous embodiment of the invention, exclusively water is used for formulation. Examples of solvents miscible with water comprise in particular alcohols, such as methanol, ethanol or propanol and also $C_1$- to $C_6$-monoalkyl ethers of mono- or oligoglycols having up to 6 alkylene oxide units such as butylethylene glycol, butyldiethylene glycol or butyltriethylene glycol.

The weight ratio of the surfactants (A) and (B) to one another is, according to the invention, from 10:1 to 1:20, preferably from 3:1 to 1:10 and very particularly preferably from 2:1 to 1:4.

According to the invention the proportion of the surfactants (A) and (B) together is at least 50% by weight, based on the proportion of all surfactants present, i.e. the surfactants (A), (B) and optionally (C) together. Preferably, the proportion is at least 75% by weight, particularly preferably at least 90% by weight, and very particularly preferably only the surfactants (A) and (B) are used as surfactants in the formulation.

In addition to the surfactants, the formulations may also comprise further components, such as, for example, $O_4$- to $C_8$-alcohols and also their alkoxylates having up to 6 alkylene oxide units and/or basic salts (so-called "alkali surfactant flooding"). With such additions, for example the retention in the formation can be reduced. The ratio of the alcohols, based on the total amount of surfactants used, is as a rule at least 1:1—however, it is also possible to use a substantial excess of alcohols. The amount of basic salts may typically range from 0.1% by weight to 5% by weight.

By the choice of the surfactants (A) and (B) and the weight ratio thereof to one another, the person skilled in the art can influence the optimum temperature for the formation of a microemulsion $T_{opt}$ and can adapt it to the temperature of the deposit. The deposits in which the process is used have as a rule a temperature of at least 15° C., for example from 15 to 130° C., preferably a temperature from 15 to 80° C. and particularly preferably a temperature from 15 to 70° C.

The total concentration of all surfactants together is from 0.05 to 5% by weight, based on the total amount of the aqueous surfactant formulation, preferably from 0.1 to 2.5% by weight. The person skilled in the art makes a suitable choice according to the desired properties, in particular according to the conditions in the mineral oil formation. It is clear here to a person skilled in the art that the concentration of the surfactants may change after injection into the formulation because the formulation can mix with formation water or surfactants can also be absorbed on solid surfaces of the formation. It is the major advantage of the mixtures used according to the invention that the formation of a microemulsion is not excessively influenced by such a change in the total concentration.

For a person skilled in the art in the field of surfactant flooding it is clear that the reservoir conditions as well, such as the reservoir temperature, the pressure, the nature of the oil in the reservoir, and the nature and amount of salts present, for example, will influence the conditions for the optimum formation of a Winsor III microemulsion. Taking account of the information above, a person skilled in the art is able to optimize the surfactant formulation by means of a few routine tests for application in specific mineral oil reservoirs.

It is of course possible and as a rule also advisable first to prepare a concentrate which is diluted only on site to the desired concentration for injection into the formation. As a rule, the total concentration of the surfactants in such a concentrate is from 15 to 60% by weight, in particular 15 to 45% by weight.

The surfactant mixtures used according to the invention with surfactants (A) prepared using double metal cyanide catalysts or double hydroxide clays have improved properties for tertiary mineral oil production. They lead in particular to especially low interfacial tension and to an especially rapid phase separation. Without wishing to be tied to a certain theory, this appears firstly to be due to a low polydispersity of the surfactants (A). Furthermore, for the use of double metal cyanide catalysts or double hydroxide clays, certain byproducts, such as, for example, allylalkyoxysulfonates, appear not to be present or to be present in smaller amounts compared with KOH catalysis. Such products can be obtained by KOH-catalyzed rearrangement of propene oxide to allyl alcohol. The allyl alcohol obtained is then alkoxylated and sulfated analogously to the alcohol $R^1$—OH. However, the products obtained are not effective as surfactants.

The following examples are intended to illustrate the invention in more detail:

Part I: Synthesis of the Surfactants (A) Used

General Method 1: Propoxylation by Means of KOH Catalysis

In a 2 l autoclave, an aqueous KOH solution which comprises 50% by weight of KOH is added to the alcohol to be propoxylated (1.0 eq). The amount of KOH is 0.3% by weight of the product to be prepared. The mixture is dewatered at 100° C. and 20 mbar for 2 hours with stirring. Thereafter, flushing is effected three times with $N_2$, an admission pressure of about 1.3 bar $N_2$ is established and the temperature is increased to 120-130° C. The propylene oxide is metered in so that the temperature remains from 125° C. to 140° C. Thereafter, further stirring is effected for 5 h at 125-140° C., flushing with $N_2$ is effected, cooling to 70° C. is effected and the reactor is emptied. The amount of alkali metal hydroxide used is neutralized with the aid of acetic acid. Alternatively, the neutralization can also be effected with commercially available magnesium silicates, which are then filtered off. The pale product is characterized with the aid of a 1H-NMR spectrum in $CDCl_3$, gel permeation chromatography and an OH number determination and iodine color number and the yield is determined.

General Method 2: Propoxylation by Means of DMC Catalysis

In a 2 l autoclave, the alcohol to be propoxylated (1.0 eq) is mixed with a double metal cyanide catalyst (e.g. DMC catalyst from BASF, type Zn—Co) at 80° C. For activation of the catalyst, 20 mbar is applied at 80° C. for 1 h. The amount of DMC is 0.1 percent by weight or less, based on the product to be prepared. Thereafter, flushing with $N_2$ is effected three times, an admission pressure of about 1.3 bar $N_2$ is established and the temperature is increased to 120-130° C. The propylene oxide is metered in so that the temperature remains from 125° C. to 140° C. Thereafter, further stirring is effected for 5 h at 125-140° C., flushing with $N_2$ is effected, cooling to 70° C. is effected and the reactor is emptied. The pale product is characterized with the aid of a 1H-NMR spectrum in $CDCl_3$, gel permeation chromatography and an OH number determination and iodine color number and the yield is determined.

General Method 3: Sulfation by Means of Chlorosulfonic Acid

In a 1 l round-necked flask, the alkyl alkoxylate to be sulfated (1.0 eq.) is dissolved in 1.5 times the amount of dichloromethane (based on % by weight) and cooled to 5-10° C. Thereafter, chlorosulfonic acid (1.1 eq.) is added dropwise so that the temperature does not exceed 10° C. The mixture is allowed to warm up to room temperature and is stirred for 4 h at this temperature under an $N_2$ stream before the above reaction mixture is added dropwise to an aqueous NaOH solution with half the volume at not more than 15° C. The amount of NaOH is calculated so that there is a slight excess relative to the chlorosulfonic acid used. The resulting pH is about 9-10. The dichloromethane is removed under slightly reduced pressure on a rotary evaporator at no more than 50° C.

The product is characterized by 1H-NMR and the water content of the solution is determined (about 70%).

The following alcohol was used for the synthesis.

| Alcohol | Description |
|---------|-------------|
| iC17 | iso-$C_{17}H_{35}$—OH; oxo alcohol, prepared by hydroformylation of isohexadecene which is obtained by tetramerization of butene. The average degree of branching of the alcohol is 3.1. |

The alcohol was propoxylated according to method 1 or 2. The respective degree of propoxylation is given in table 1. The iC$_{17}$-propoxylate based on KOH catalysis comprised, according to the iodine color number and $^1$H-NMR, 4% of rearrangement product (allyl propoxylate) while the alkyl propoxylate based on DMC catalysis had, according to the iodine color number and 1H-NMR, <1% of rearrangement product. Both alkyl propoxylates were then sulfated according to method 3. The degree of sulfation is in each case >95% according to 1H-NMR.

The unit used was an Agilent 1200 series with pump, degasser, $R^1$ detector, autosampler and column thermostat, PSS 6.03 was used as software. The following columns were used:

precolumn SDV 5μ—8×50 mm
SDV 5 μ 100 Å
SDV 5μ 1000 Å
SDV 5μ 100 000 Å

Calibration substances were DIN polystyrene from PSS. Toluene served as a standard. The eluent was tetrahydrofuran for chromatography. The flow rate was 1 ml/min. About 25 mg of the sample are dissolved in 1 ml of solvent (250 ml of THF—1.5 g of toluene), the toluene being mixed beforehand with the THF in order to obtain reproducible results.

The comparison of the polydispersities obtained by GPC shows that alkoxylated alcohols iC$_{17}$—O—(CH$_2$—CH—(CH$_3$)O)$_{7.8}$H prepared by DMC catalysis have a narrower molecular weight distribution and hence lower polydispersity (D=1.047) than iC$_{17}$—O—(CH$_2$—CH—(CH$_3$)O)$_{7.9}$H (D=1.060) prepared by KOH catalysis.

Testing of Performance Characteristics

The following tests were carried out with the surfactants obtained, in order to rate their properties for tertiary mineral oil production.

Description of the Methods of Measurement
Determination of SP* a) Principle of the Measurement:

The interfacial tension between water and oil was determined in a known manner via the measurement of the solubilization parameter SP*. The determination of the interfacial tension by the determination of the solubilization parameter SP* is a method accepted among those skilled in the art for the approximate determination of the interfacial tension. The solubilization parameter SP* indicates how many ml of oil is dissolved per ml of surfactant used in a microemulsion (Winsor type III). The interfacial tension σ (IFT) can be calculated therefrom via the approximation formula IFT≈0.3/(SP*)$^2$ if equal volumes of water and oil are used (C. Huh, J. Coll. Interf. Sc., vol. 71, no. 2 (1979)).

Test results:

A 1:1 mixture of decane and a 6% strength NaCl solution was used. A surfactant mixture comprising 3 parts of the alkylpropoxysulfate used in each case (surfactant (A)) and 1 part of dodecylbenzenesulfonate (surfactant B) were added thereto. The main surfactant concentration was 5 percent by weight of the water phase. Butyldiethylene glycol (BDG) was used as a further surfactant (C). The cosurfactant concentration was 4 percent by weight of the water phase. The results are listed in table 1.

Example 1 and comparative example 1 show that the surfactant (A) prepared by means of DMC catalysis give lower interfacial tensions and faster formation of the microemulsion (shorter separation time) than corresponding alkylpropoxysulfates having the same number of propoxy units but alkoxylation under KOH catalysis.

TABLE 1

List of the results

| Example no. | Surfactant (A) | Surfactant (B) | Weight ratio (A)/(B) | Total amount (A) + (B) [% by weight] | Surfactant (C) Type | Amount [% by weight] | Total concentration surfactants [% by weight] | Proportion (A) + (B) based on all surfactants | $T_{opt}$ [° C.] | SP* | IFT [mN/m] at $T_{opt}$ | Separation time [min] |
|---|---|---|---|---|---|---|---|---|---|---|---|---|
| Ex. 1 | iC17-7.8 PO-sulfate (DMC catalysis) | DBS | 3:1 | 5 | BDG | 4 | 9 | 55.6 | 45 | 4.5 | 0.0148 | 5 |
| C1 | iC17-7.9 PO-sulfate (KOH catalysis) | DBS | 3:1 | 5 | BDG | 4 | 9 | 55.6 | 51 | 3.3 | 0.0275 | 10 |

BDG: butyldiethylene glycol
DBS: dodecylbenzenesulfonate, Na salt, $C_{12}H_{25}PhSO_3N$ b) Working Method For determining the SP*, a 100 ml measuring cylinder with magnetic stirring rod is filled with 20 ml of oil and 20 ml of water. 5 percent by weight of the mixture of the surfactants (A) and (B) as main surfactant and 4 percent by weight of the butyldiethylene glycol as cosurfactant (C), based on the water phase, are added thereto. Thereafter, the temperature is increased stepwise from 20 to 90° C., and the temperature range within which a microemulsion formed is observed.

The formation of the microemulsion can be observed visually or with the aid of conductivity measurements. A three-phase system (upper phase oil, middle phase microemulsion, lower phase water) forms. If upper and lower phase are of the same magnitude and moreover nothing changes over a period of 12 h, the optimum temperature ($T_{opt}$) of the microemulsion has been found. The volume of the middle phase is determined. The volume of added surfactant is subtracted from this volume. The value obtained is then divided by two. This volume is now divided by the volume of added surfactant. The result is noted as SP*.

The type of oil and water used for determining SP* is determined according to the system to be investigated. Firstly, mineral oil itself can be used, or a model oil, such as, for example, decane or hexadecane. Both pure water and saline water can be used as water in order better to model the conditions in the mineral oil formation. The composition of the aqueous phase can be adjusted, for example, according to the composition of a certain reservoir water.

Information on the aqueous phase used and the oil phase is to be found below in the specific description of the experiments.

We claim:

1. A process for mineral oil production by surfactant flooding comprising forcing an aqueous surfactant formulation comprising at least one anionic surfactant and at least one further surfactant through at least one injection well into a mineral oil deposit and producing mineral oil by removing the mineral oil from the deposit through at least one production well, wherein the aqueous surfactant formulation comprises (A) at least one surfactant (A) of the general formula
   $R^1$—O—($CH_2$—CH—($CH_3$)O)$_x$—($CH_2$—$CH_2$O)$_y$—$SO_3M$, in which
   $R^1$ is a straight-chain or branched aliphatic and/or aromatic hydrocarbon radical having 8 to 32 carbon atoms,
   M is H$^+$ and/or a k-valent counterion 1/k Y$^{k+}$,
   x is a number from 4 to 30, and
   y is a number from 0 to 30,
   and the sum x +y is ≤50,
   the surfactant (A) being prepared by sulfation of the alkoxylated alcohol $R^1$—O—($CH_2$—CH—($CH_3$)O)$_x$—($CH_2$—$CH_2$O)$_y$—H, with the proviso that the alkoxylated alcohol is prepared by alkoxylation of an alcohol $R_1$—OH using double metal cyanide catalysts or double hydroxide clays, and (B) at least one surfactant (B) differing therefrom and of the general formula $R^2$—Y, in which
   $R^2$ is a straight-chain or branched aliphatic and/or aromatic hydrocarbon radical having 8 to 32 carbon atoms and Y is a hydrophilic group,
   the weight ratio (A)/(B) being from 10:1 to 1:20, and the proportion of the surfactants (A) and (B) together being at least 50% by weight, based on the amount of all surfactants in the aqueous surfactant formulation.

2. The process according to claim 1, wherein $R^1$ is a linear, aliphatic hydrocarbon radical and x is a number from 4 to 30.

3. The process according to claim 1, wherein $R^1$ is a branched, aliphatic hydrocarbon radical and x is a number from 4 to 30.

4. The process according to claim 1, wherein the group Y of the surfactant (B) is a group selected from the group consisting of sulfate groups, sulfonate groups, polyoxyalkylene groups, anionically modified polyoxyalkylene groups, betaine groups, glucoside groups or amine oxide groups.

5. The process according to claim 1, wherein the surfactant (B) is an anionic surfactant.

6. The process according to claim 1, wherein the surfactant (B) is a surfactant selected from the group consisting of alkyl ethoxylates, the polyether group of the surfactant comprising in each case from 2 to 40 ether units.

7. The process according to claim 1, wherein the surfactant (B) is at least one surfactant selected from the group consisting of alkylbenzenesulfonates, olefinsulfonates or paraffinsulfonates.

8. The process according to claim 1, wherein the total concentration of all surfactants together is from 0.05 to 5% by weight, based on the total amount of the aqueous surfactant formulation.

9. The process according to claim 1, wherein the process constitutes Winsor type III microemulsion flooding, the interfacial tension between water and oil being less than 0.1 mN/m.

10. The process according to claim 9, wherein the interfacial tension is less than 0.01 mN/m.

11. The process according to claim 2, wherein the group Y of the surfactant (B) is a group selected from the group consisting of sulfate groups, sulfonate groups, polyoxyalkylene groups, anionically modified polyoxyalkylene groups, betaine groups, glucoside groups or amine oxide groups.

12. The process according to claim 3, wherein the group Y of the surfactant (B) is a group selected from the group consisting of sulfate groups, sulfonate groups, polyoxyalkylene groups, anionically modified polyoxyalkylene groups, betaine groups, glucoside groups or amine oxide groups.

13. The process according to claim 2, wherein the surfactant (B) is an anionic surfactant.

14. The process according to claim 3, wherein the surfactant (B) is an anionic surfactant.

15. The process according to claim 2, wherein the surfactant (B) is a surfactant selected from the group consisting of alkyl ethoxylates, the polyether group of the surfactant comprising in each case from 2 to 40 ether units.

16. The process according to claim 3, wherein the surfactant (B) is a surfactant selected from the group consisting of alkyl ethoxylates, the polyether group of the surfactant comprising in each case from 2 to 40 ether units.

17. The process according to claim 2, wherein the surfactant (B) is at least one surfactant selected from the group consisting of alkylbenzenesulfonates, olefinsulfonates or paraffinsulfonates.

18. The process according to claim 3, wherein the surfactant (B) is at least one surfactant selected from the group consisting of alkylbenzenesulfonates, olefinsulfonates or paraffinsulfonates.

\* \* \* \* \*